(12) United States Patent
Zhu et al.

(10) Patent No.: US 10,375,905 B2
(45) Date of Patent: Aug. 13, 2019

(54) DETACHABLE FRAME OF LIGHT-SMALL SPRINKLING MACHINE FOR PRECISE IRRIGATION

(71) Applicant: Jiangsu University, Zhenjiang County (CN)

(72) Inventors: Xingye Zhu, Zhenjiang County (CN); Shouqi Yuan, Zhenjiang County (CN); Junping Liu, Zhenjiang County (CN); Kun Tian, Zhenjiang County (CN); Jinghong Wan, Zhenjiang County (CN); Ya Bao, Zhenjiang County (CN); Xingfa Liu, Zhenjiang County (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 15/549,001

(22) PCT Filed: Mar. 16, 2016

(86) PCT No.: PCT/CN2016/076438
§ 371 (c)(1),
(2) Date: Aug. 4, 2017

(87) PCT Pub. No.: WO2017/143634
PCT Pub. Date: Aug. 31, 2017

(65) Prior Publication Data
US 2018/0352758 A1    Dec. 13, 2018

(30) Foreign Application Priority Data
Feb. 23, 2016    (CN) .......................... 2016 1 0098064

(51) Int. Cl.
*A01G 25/09* (2006.01)
*A01G 25/02* (2006.01)
*B05B 15/62* (2018.01)

(52) U.S. Cl.
CPC ............. *A01G 25/09* (2013.01); *A01G 25/02* (2013.01); *B05B 15/62* (2018.02); *Y02A 40/237* (2018.01)

(58) Field of Classification Search
CPC .... A01G 25/09–25/097; A01G 25/16–25/167; A01C 23/00–23/047;
(Continued)

(56) References Cited

U.S. PATENT DOCUMENTS

| 4,332,501 A * | 6/1982 | Slysh ........................ E04B 1/19 403/171 |
| 4,735,365 A | 4/1988 | Smeller et al. |

(Continued)

FOREIGN PATENT DOCUMENTS

| CN | 2543340 Y | 4/2003 |
| CN | 104521698 A | 4/2015 |

(Continued)

*Primary Examiner* — Arthur O. Hall
*Assistant Examiner* — Tuongminh N Pham
(74) *Attorney, Agent, or Firm* — Greenberg Traurig, LLP

(57) ABSTRACT

A detachable frame of a light-small sprinkling machine includes angle steel pieces, tiepieces, support bars, support upright rods, top rod with slots, and wheels. The components of the frame are connected through threaded connections, so that the frame can be disassembled and removed easily. The distance between sprinkler heads and the mounting height of the sprinkler heads may be changed by means of free movement of turning hooks in the top rod with slots. The number of spans of the rod of the machine are be selected according to the topographic structure and can be changed by means of threaded holes in the two ends of the top rod with slots, and thereby the length of the rod can be changed. Employing low-pressure sprinkler heads and utilizing the turning effect of movable swivel shafts, the irrigation sprinkling machine can be turned to any direction freely.

6 Claims, 2 Drawing Sheets

(58) Field of Classification Search
CPC .... F16B 7/185; Y10T 403/44; Y10T 403/341; E04C 3/08; E04C 2003/0495; E04C 2001/1936; E04C 1/1903; E04C 1/2608; B05B 15/60
USPC ........ 239/722–754, 159–176; 52/696, 655.1, 52/653.1, 655.2, 648, 650.2; 403/171, 403/217, 218, 173, 176; 248/75
See application file for complete search history.

(56) References Cited

U.S. PATENT DOCUMENTS

| | | | | |
|---|---|---|---|---|
| 5,127,759 | A * | 7/1992 | Orbom | E04B 1/1903 403/171 |
| 5,961,365 | A * | 10/1999 | Lambert | A63H 33/10 403/170 |
| 9,091,052 | B1 * | 7/2015 | Summers | E04B 1/1903 |
| 9,545,063 | B1 * | 1/2017 | Kastl | A01G 25/092 |
| 2008/0313992 | A1 * | 12/2008 | Schornack | F16B 33/002 52/696 |

FOREIGN PATENT DOCUMENTS

| | | |
|---|---|---|
| DE | 3921291 A1 | 1/1991 |
| RU | 2242117 C1 | 12/2004 |

* cited by examiner

DETACHABLE FRAME OF LIGHT-SMALL SPRINKLING MACHINE FOR PRECISE IRRIGATION

CROSS REFERENCE TO RELATED APPLICATION

This application is a U.S. National Phase Application under 35 U.S.C. 371 of International Application No. PCT/CN2016/076438, filed on Mar. 16, 2016, which claims priority to Chinese Patent Application No. 201610098064.9, filed on Feb. 23, 2016, each of which are incorporated herein by reference in their entirety.

FIELD OF THE DISCLOSURE

The present invention relates to a key component of an irrigation equipment for modern agricultural production, in particular to a detachable frame of a light-small sprinkling machine for precise irrigation.

BACKGROUND OF RELATED ART

Sprinkling irrigation is one of the water-saving irrigation techniques that are applied the most widely in the world nowadays, owing to its advantages such as high adaptability and easy mechanical operation, etc. As the major irrigation equipment that achieves water-saving irrigation, sprinkling machines have been widely applied recently. At present, there are mainly three types of sprinkling machines in China, i.e., large-size sprinkling machines, reel sprinkling machines, and medium-size or small-size sprinkling machines. Large-size sprinkling machines involve high investment and complex equipment, require imported key components, and are not adaptive to the complex and varying topographic structures and remote hilly areas in China; reel sprinkling machines involve inefficient water turbine and transmission mechanism, have poor intelligent performance that results in poor sprinkling irrigation quality, and do not meet the developing trend of water-saving agriculture; light-small sprinkling machines available in the present market are not suitable for use widely, because they have a cumbersome structure and involve high labor intensity for displacement. Furthermore, the evenness of sprinkling irrigation water distribution is an important evaluation criterion for sprinkling irrigation quality and an important parameter in the planning and design of sprinkling irrigation systems. The combination spacing between sprinkler heads and the mounting height of sprinkler heads have great influences on the evenness of sprinkling irrigation water distribution; however, the sprinkler heads on sprinkling machines available in the present market are mounted at fixed positions or difficult to displace. Therefore, it is of great significance to develop a detachable frame of light-small sprinkling machine for precise irrigation, in order to mitigate the difficulty of high labor intensity in displacement of sprinkling machines group in the industry, overcome the technical challenge of even sprinkling over different crops and different plots, and improve even distribution of sprinkling water.

At present, no relevant documentation is found after search.

SUMMARY

The object of the present invention is to provide a detachable frame of a light-small sprinkling machine for precise irrigation, which is adaptive to the complex topographic structures in China, and has advantages of simple structure, easy operation, convenient displacement, high sprinkling efficiency, good sprinkling evenness, and low power consumption, etc.

A detachable frame of a light-small sprinkling machine for precise irrigation, comprising angle steel pieces, tiepieces, support bars, support upright rods, top truss with slots, and wheels, wherein, four wheels are connected with four support upright rods respectively, and the four wheels are arranged in a rectangular layout, with two wheels on left and right sides respectively; the support upright rods are arranged vertically, and the angle steel pieces are arranged on the top of the support upright rods; adjacent support upright rods in front-back direction and left-right direction are connected via two support bars arranged crossing with each other, one end of each support bar is connected with the angle steel piece on the top of the support upright rod, and the other end of the support bar is connected with the bottom of the adjacent support upright rod; the top corners on surface A and bottom corners on surface B of the four angle steel pieces are cut and deflexed by an angle of 30°~45° respectively, the two angle steel pieces on the adjacent two sides in left-right direction are arranged symmetrically, and the two angle steel pieces on the adjacent two sides in front-back direction are arranged symmetrically; the deflexed top corners on surface A of the two angle steel pieces on the adjacent two sides in left-right direction are connected with one end of two tiepieces respectively, and the other end of the two tiepieces is connected to and supports to the top truss with slots respectively; the top corners on surface B of the two angle steel pieces on the adjacent two sides in left-right direction are connected with one end of two tiepieces respectively, and the other end of the two tiepieces is connected to and supports to the top truss with slots respectively; the deflexed bottom corners on surface B of the two angle steel pieces on the adjacent two sides in left-right direction are connected with one end of two tiepieces respectively, and the other end of the two tiepieces is connected to and supports to the top truss with slots respectively.

The truss with top slots comprises a top truss A with slots and a top truss B with slots, the top truss A with slots and top truss B with slots are composed of long rods that are in the same shape and have slots arranged on four sides of them, the top truss A with slots and top truss B with slots have threaded holes in two ends of them, and the number of the top truss with slots can be changed by means of connection with threaded holes via fixing plates between the top truss A with slots and the top truss B with slots. The slots arranged on the four sides are provided to meet the length of standard bolts when connecting, save material, and enable the long rods to be assembled flexibly regardless of the normal direction or reversed direction of the top truss with slots; the threaded turning hooks can be freely moved axially in the slots. The top truss with slots has threaded holes in the two ends, so that the top truss with slots can be connected and extended by means of bolts via fixing plates; thus, the number of spans of the truss can be changed, and thereby the length of the truss can be changed.

The detachable frame further comprises threaded turning hooks, wherein, bolts are welded on the top of the threaded turning hooks, and O-gaskets and nuts are mounted on the threaded portions of the bottom ends of the threaded turning hooks; the threaded turning hooks are disposed in the slots of the top truss with slots and can be freely moved axially in the truss; sprinkler heads are arranged on the threaded turning hooks. The threaded turning hooks can be moved freely in the truss, and can be fixed at relative positions in the truss by means of the thread pre-tensioning effect. Pendent hoses are connected downwardly to the sprinkler heads via the threaded turning hooks, the spacing between the sprinkler heads can be adjusted freely by changing the positions of the threaded turning hooks, and the mounting height of the sprinkler heads can be adjusted by controlling the length of the pendent hoses on the threaded turning hooks.

The angle steel piece is made of angle steel bent to a right angle, wherein, the part at the top left corner on a surface is cut and deflexed inwardly by 30°~45°. The angle steel pieces are connected with the tiepieces, support bars, and support upright rods through bolts. A threaded hole is arranged in the surface that is deflexed inwardly, the support is fixed the by the tiepieces and the height of the support also is determined by the tiepieces. A threaded hole is arranged in the surface that is deflexed inwardly at the bottom left corner, support bars are fixed by threaded connections to stabilize the frame. Another threaded hole of the same size is arranged in the surface that is deflexed inwardly at the bottom right corner, to fix the support upright rods by the threaded hole and support the entire frame. The part at the bottom right corner on another surface of the angle steel piece is cut and deflexed outwardly by 30°~45°. A threaded hole is also arranged therein. Thus, utilizing the two parts that are cut and deflexed from the angle steel piece, different tiepieces can support at the same height in the same line, so that the fixed tiepieces stabilize the frame connections and support the entire frame. The width of the support truss can be adjusted by means of the deflection angle, so that the frame is more stable and has attractive appearance. Another threaded hole is arranged in the another surface at the bottom left corner, to connect the support bars by the threaded holes and stabilize the frame through the support bars. The threaded hole at the top right corner on the another surface is connected with tiepiece, similar to the above-mentioned threaded holes for connecting tiepieces, to support and stabilize the frame. With the angle steel piece, the upward positions of the tiepieces can be adjusted by means of the three holes connecting tiepieces, so that the other ends of the three tiepieces are at the same height; in addition, the upward angles of the tiepieces can be adjusted, and the height of the frame can be adjusted.

The tie bar is made of a stainless steel bar that has a rectangular cross section, and is arranged with a slot, in which a water pipeline is arranged. The tiepieces are connected to the angle steel piece, are at an angle between each other and at an upward angle from the horizontal direction, so that the frame is symmetrical in left-right direction and has stability. The tiepieces are also arranged with slots, in which water pipelines are arranged and fixed.

The upper end of the support upright rod is connected with the angle steel piece through a threaded connection, and the lower end of the support upright rod is connected with the movable swivel shaft, the purpose of which is to support the entire "tent-shaped" frame through the support upright rods and carrier the water pipelines. One end of the support bar is connected with the angle steel piece on the support upright rod through a threaded connection, the other end of the support bar is connected with the lower end of the adjacent support upright rod, and every two crossing support bars are connected with each other through a threaded connection, in order to stabilize the entire frame.

The four wheels are connected with the four support upright rods via movable swivel shafts respectively, the purpose of which is to fix the positions of the wheels and adjust the directions of the wheels by changing the positions of bolts in the arc slots.

The equipment in the present invention is simple in structure, convenience to adjust, easy to detach; the truss length, sprinkler head spacing, and sprinkler head mounting height can be adjusted according to the topographic structure to achieve high sprinkling evenness and high evenness of sprinkling water distribution; low-pressure sprinkler heads are used on the pendent hoses to reduce energy consumption and save water resource.

Figure 1:
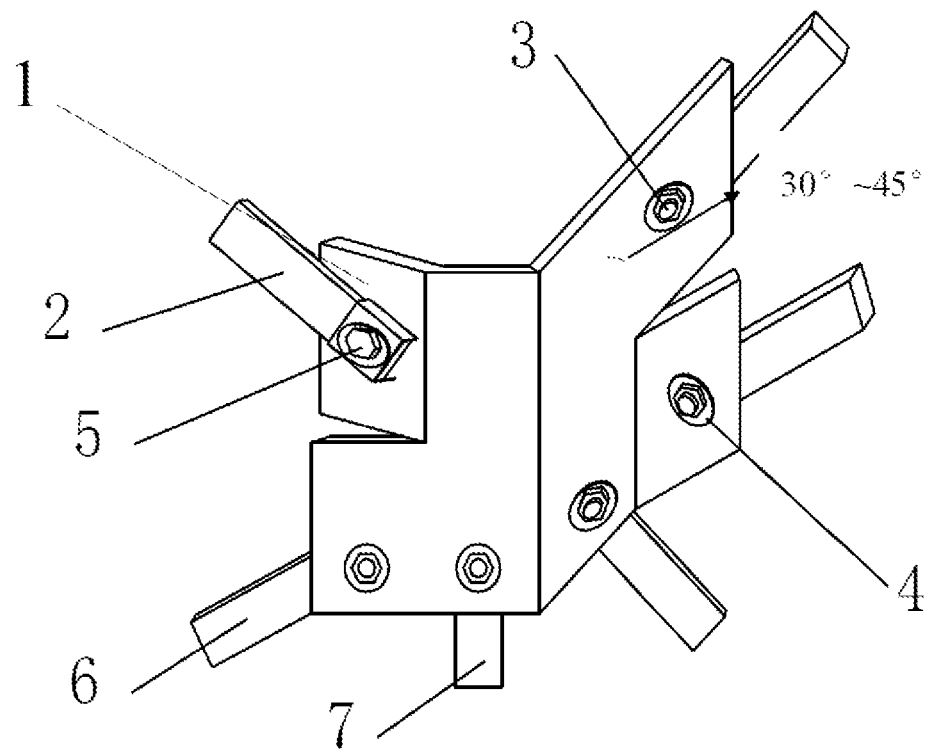
FIG. 1 is a schematic diagram of the structure and connection application of angle steel pieces for connection of a sprinkling machine for precise irrigation according to the present invention.
Figure 2:
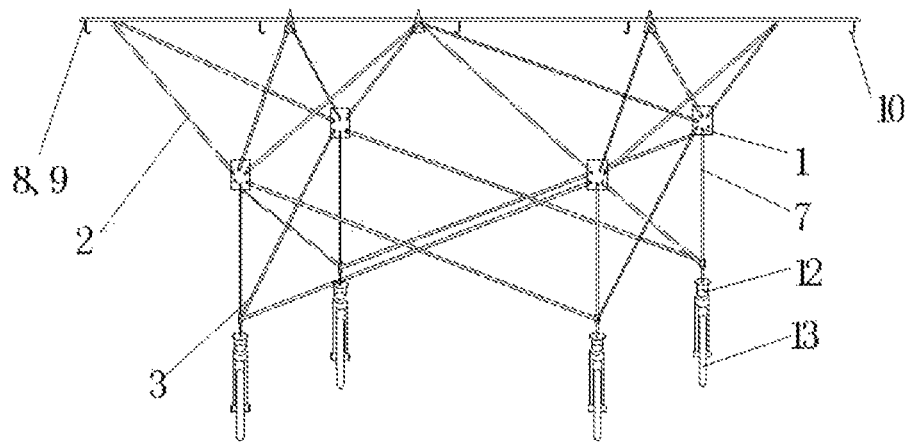
FIG. 2 is a structural schematic diagram of the detachable frame of a light-small sprinkling machine for precise irrigation according to the present invention.
Figure 3:
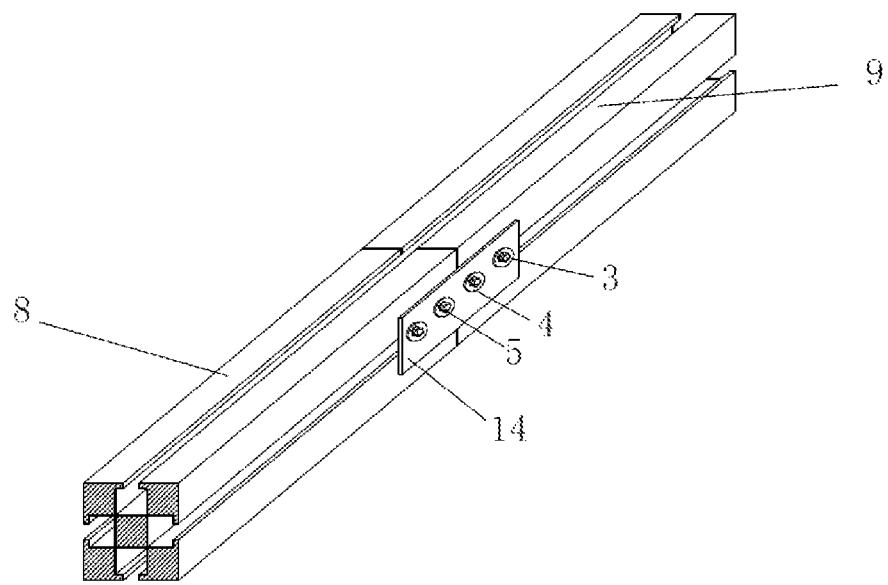
FIG. 3 is a structural schematic diagram of the connection of the top truss with slots.
Figure 4:
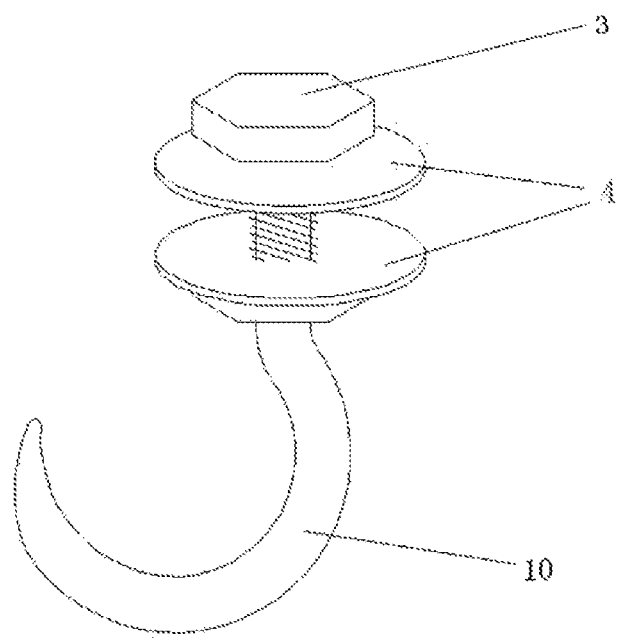
FIG. 4 is a structural schematic structural diagram of the threaded turning hook.

In the figures: 1—angle steel piece; 2—tiepiece; 3—bolt; 4—O-gasket; 5—nut; 6—support bar; 7—support upright rod; 8—top truss A with slots, 9—top truss B with slots, 10—threaded turning hook; 12—movable swivel shaft; 13—wheel; 14—fixing plate.

DETAILED DESCRIPTION

As shown in the figures, the top truss A8 with slots and top truss B9 with slots are quadrangular prisms that have a rectangular cross section and arranged with slots in the four surfaces respectively. Threaded holes are arranged in the two ends of the truss, so that the top trusses 8 and 9 with slots can be connected and extended by bolts with fixing plates 14 via the threaded holes. A nut 5 is welded on the top of the threaded turning hook 10, the lower section of the threaded turning hook 10 is a hook with threads, and a nut 5 is mounted on the threads. The nut 5 fixed on the top is disposed in a slot of the top truss, so that the threaded turning hooks 10 can be freely moved axially in the top trusses 8 and 9 with slots. The tiepiece 2 are connected to the angle steel piece 1, and are at an angle between each other and at an upward angle from the horizontal direction, to support and fix the top truss with slots. The tiepiece 2 is also arranged with a slot, in which a water pipeline is arranged. The angle steel piece 1 is made of angle steel piece 1 bent to a right angle, wherein, the part at the top left corner on a surface is cut and deflexed inwardly by 30°~45°. A threaded hole is arranged in the surface that is deflexed inwardly, to fix the support by the tiepieces 2 and determine the height of the support. Another threaded hole is arranged in the surface at the bottom left corner, to fix the support bars 6 by threaded connections. Another threaded hole of the same size is arranged in the surface at the bottom right corner, to fix the support upright rods 7 via the threaded hole. The part at the bottom right corner on another surface of the angle steel piece 1 is cut and deflexed outwardly by 30°~45°. A threaded hole is also arranged therein. Thus, utilizing the two parts that are cut and deflexed from the angle steel piece 1, different tiepieces 2 can support at the same height in the same line, so that the fixed tiepieces 2 stabilize the frame connections and support the entire frame. Another threaded hole is arranged in the another surface at the bottom left corner, to connect the support bars 6; tiepieces 2 are also connected to the threaded holes at the top right corner on the another surface. The upper end of the support upright rod 7 is connected with the angle steel piece 1 through a threaded connection, and the lower end of the support upright rod 7 is connected with a movable swivel shaft 12. One end of the support bar 6 is connected with the angle steel piece 1 through a threaded connection, and the other end of the support bar 6 is connected with the lower end of the adjacent support upright rod 7. The upper end of the movable swivel shaft 12 is connected with the support upright rod 7, and the lower end of the movable swivel shaft 12 is connected with the wheel 13, so that the wheel can rotate around the support upright rod 7 via the movable swivel shaft 12, and thereby the sprinkling machine can be turned to a desired direction. The wheels 13 are connected with the movable swivel shafts 12 via hose clamp.

The working process is as follows: When a rectangular plot having a width of 13 m is to be irrigated, for example, the parts of the frame are transported to the target plot first; in view that the width of the plot is 13 m, the covering radius of the low-pressure sprinklers is set to 2.5 m at certain mounting height and pressure, and a truss having a length of approx. 12 m and 5 low-pressure sprinkler head are required. Two top trusses with slots having a length of 6 m are used, and are connected by means of fixing plates. The sprinkler head spacing is set to about 3 m and the sprinkler head mounting height is set to about 1 m by adjusting the positions of the turning hooks in the top truss and the length of the pipelines according to the growth condition and array pitch of the crops. Five threaded turning hooks are mounted in the top truss with slots, the spacing between the threaded turning hooks is adjusted, and the threaded turning hooks are fixed by tightening up the bolts; the ratio of travel time to stop time of the sprinkling machine is adjusted and controlled according to the demand of the crops, so as to regulate the operating speed to achieve a precipitation depth desired by the crops.

We claim:

1. A detachable frame of a sprinkling machine for irrigation, comprising:
   at least four angle steel pieces, tiepieces, support bars, at least four support upright rods, top rod with slots, and wheels, wherein, four wheels are connected with the at least four support upright rods respectively, and the four wheels are arranged in a rectangular layout, with two wheels on left and right sides respectively;
   the at least four support upright rods are arranged vertically, and each of the at least four angle steel pieces are arranged on a top of each of the support upright rods;
   two of the at least four support upright rods in front-back direction and two of the at least four adjacent support upright rods left-right direction are connected via two support bars arranged crossing each other, one end of each support bar is connected with the one of the at least four angle steel pieces on the top of each support upright rod, and the other end of the support bar is connected with a bottom of the support upright rod;
   the at least one top corner on surface A and at least one bottom corner on surface B of the at least four angle steel pieces are cut and deflexed by an angle of 30° ~ 45° respectively, two of the at least four angle steel pieces on the adjacent two sides in left-right direction are arranged symmetrically, and two of the at least four angle steel pieces on the adjacent two sides in front-back direction are arranged symmetrically;
   the at least one top corner on surface A of two of each of the at least four angle steel pieces on the adjacent two sides in left-right direction are connected with one end of each of two first tiepieces respectively, and the other end of each of the two first tiepieces is connected to and supports the top rod with slots respectively;
   at least one top corner on surface B of two of each of the at least four angle steel pieces on the adjacent two sides in left-right direction are connected with one end of each of two second tiepieces respectively, and the other end of each of the two second tiepieces is connected to and supports the top rod with slots respectively;
   the at least one bottom corner on surface B of two of the at least four angle steel pieces on the adjacent two sides in left-right direction are connected with one end of each two third tiepieces respectively, and the other end of each of the two third tiepieces is connected to and supports the top rod with slots respectively; and
   wherein the angle steel pieces, tiepieces, support bars, at least four support upright rods are connected through threaded connections.

2. The detachable frame of a sprinkling machine for irrigation according to claim 1, wherein, the top rod with slots comprises a top rod A with slots and a top rod B with slots, each having two ends, the top rod A with slots and a top rod B with slots are composed of long rods that are in the same shape and have slots on four sides, and top rod A and top rod B both having threaded holes arranged on each end;
   the number of top rod with slots and the length of the rod can be changed by means of the threaded holes via fixing plates between the top A with slots and the top rod B with slots.

3. The detachable frame of a sprinkling machine for irrigation according to claim 2, further comprising a plurality of threaded turning hooks, each threading turning hook having a top and lower end, wherein, bolts (3) are welded on a top of the threaded turning hooks, O-gaskets (4) and nuts are mounted on the threaded portions of the lower ends of the threaded turning hooks, the threaded turning hooks are disposed in the slots of at least one of the top rods with slots and can be freely moved axially in the at least one top rod.

4. The detachable frame of a sprinkling machine for precise irrigation according to claim 1, wherein, the angle steel pieces are connected with the first, second and third tiepieces, support bars, and the at least four support upright rods by bolts.

5. The detachable frame of a sprinkling machine for irrigation according to claim 1, wherein, the first, second, and third tiepieces are arranged with slots.

6. The detachable frame of a sprinkling machine for irrigation according to claim 1, wherein, the four wheels are connected with the at least four support upright rods via movable swivel shafts respectively.

* * * * *